United States Patent [19]
Zheng

[11] Patent Number: 5,845,697
[45] Date of Patent: Dec. 8, 1998

[54] SPRING LOOP WITH PROTECTIVE COVERING

[75] Inventor: Yu Zheng, Covina, Calif.

[73] Assignee: Patent Category Corp., Monrovia, Calif.

[21] Appl. No.: 929,822

[22] Filed: Sep. 15, 1997

[51] Int. Cl.⁶ ....................................................... B60J 3/00
[52] U.S. Cl. ................................ 160/370.21; 160/DIG. 2
[58] Field of Search ............................... 160/370.21, 405, 160/DIG. 2, DIG. 3, 387, 127, 128, 237, 377; 296/95.1, 97.7, 97.8

[56] References Cited

U.S. PATENT DOCUMENTS

| | | |
|---|---|---|
| 4,815,784 | 3/1989 | Zheng . |
| 5,024,262 | 6/1991 | Huang .............................. 160/370.21 X |
| 5,035,460 | 7/1991 | Huang .............................. 160/370.21 X |
| 5,038,812 | 8/1991 | Norman . |
| 5,116,273 | 5/1992 | Chan .................................. 160/370.21 |
| 5,213,147 | 5/1993 | Zheng . |
| 5,358,440 | 10/1994 | Zheng . |
| 5,378,518 | 1/1995 | Wang .............................. 160/DIG. 2 X |
| 5,452,934 | 9/1995 | Zheng .............................. 160/370.21 X |
| 5,467,794 | 11/1995 | Zheng . |
| 5,553,908 | 9/1996 | Shink .............................. 160/370.21 X |

*Primary Examiner*—David M. Purol
*Attorney, Agent, or Firm*—Raymond Sun

[57] ABSTRACT

A spring loop assembly is provided which has an expanded configuration and a collapsed configuration. The spring loop assembly can be twisted and folded from the expanded configuration to reduce the overall size of the spring loop assembly in the collapsed configuration. The spring loop assembly includes a loop member forming a continuous loop, with the loop member having an elongated cross-section throughout. The loop member forms a plurality of concentric loops when in the collapsed configuration. The spring loop assembly further includes a covering surrounding the outer surface of the loop member in a tight-fit manner, the covering having an elongated cross-section throughout.

27 Claims, 3 Drawing Sheets

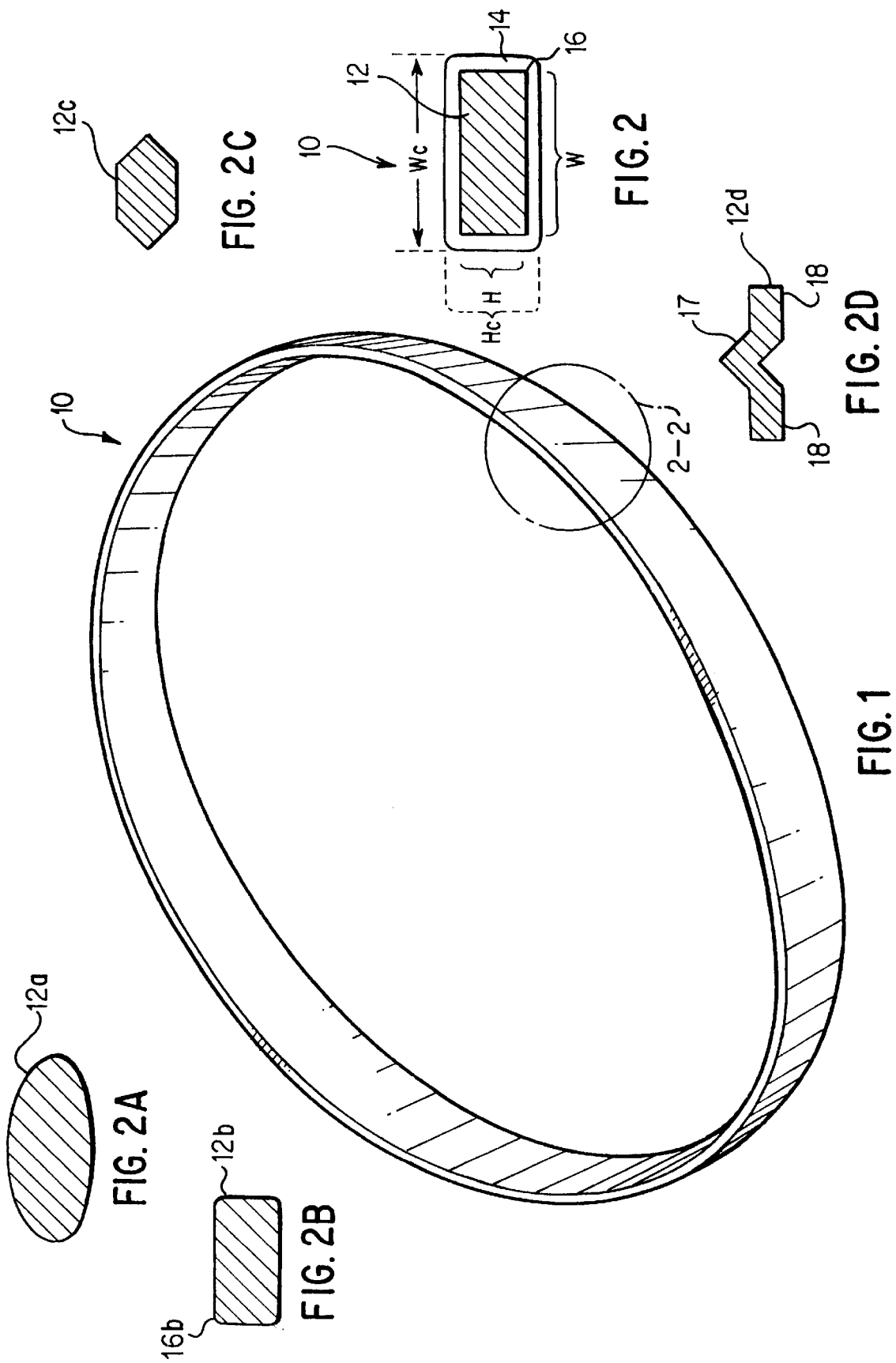

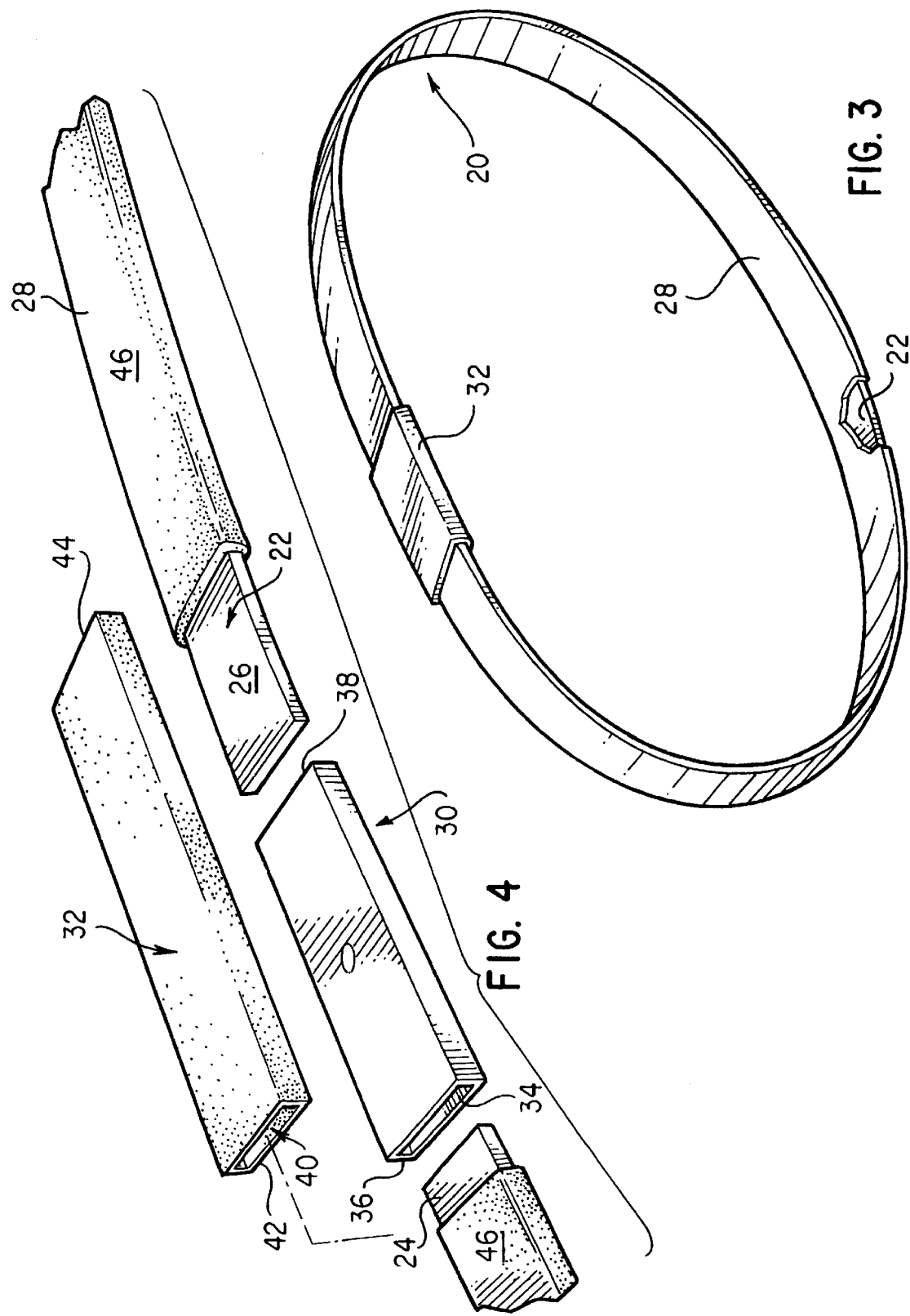

SPRING LOOP WITH PROTECTIVE COVERING

BACKGROUND OF THE INVENTION

1. Field of the Invention

The present invention relates to spring loops that have an expanded configuration and a collapsed configuration, and which can be twisted and folded from the expanded configuration to reduce the overall size of the spring loop in the collapsed configuration. In particular, the present invention relates to a protective covering for use with spring loops.

2. Description of the Prior Art

Collapsible structures and objects are becoming increasingly popular with both children and adults. These structures and objects are usually provided with a continuous spring loop acting as a support frame, and a fabric or other panel extending between the spring loop. The combined loop and panel can assume an expanded configuration and a collapsed configuration, and can be twisted and folded from the expanded configuration to reduce the overall size of the combined loop and panel in the collapsed configuration. One or more sets of these combined loops and panels are interconnected to create a wide variety of structures and objects, including automobile sunshades, tents, shelters, flying discs, and toy boxes, among others. The ability to fold and collapse these structures and objects into a smaller size greatly facilitates storage and transportation, thereby making these structures and objects convenient to use and increasing their entertainment value. Examples of these structures and objects are illustrated in U.S. Pat. No. 4,815,784 (Zheng), U.S. Pat. No. 5,301,705 (Zheng), U.S. Pat. No. 5,358,440 (Zheng), U.S. Pat No. 5,452,934 (Zheng), and U.S. Pat. No. 5,560,385 (Zheng).

The continuous spring loops are typically retained or held within fabric sleeves provided along the edges of the fabric or other panel. The spring loops may be provided as one continuous loop, or may be a strip of material connected at both ends to form a continuous loop. These spring loops are usually formed of flexible coilable steel, although other materials such as plastics are also used. The spring loops are usually made of a material which is relatively strong and yet is flexible to a sufficient degree to allow it to be coiled. Thus, each spring loop is capable of assuming two configurations, a normal open or expanded configuration, and a folded or collapsed configuration in which the spring loop is collapsed into a size which is much smaller than its open configuration. The spring loops may be retained within the respective fabric sleeves without being connected thereto. Alternatively, the sleeves may be mechanically fastened, stitched, fused, or glued to the spring loops to retain them in position.

Unfortunately, these spring loops can sometimes break after extended use or physical abuse. In particular, when each spring loop is folded to assume its collapsed configuration, the spring loop becomes a plurality of concentric loop members that have been coiled against each other and retained together. A significant amount of stress is stored in these coiled concentric loop members, which exhibit a resiliency or "shape memory" feature that causes the coiled concentric loop members to spring back to the normal expanded single spring loop when the concentric loop members are not retained together. In addition, the twisting and folding actions required to collapse the spring loop exert additional stress on the portions of the spring loop that are twisted. Therefore, extended use or abuse may cause these spring loops to break at the portions where the stress has had the greatest impact.

Breakage of a spring loop can be very troublesome to the structure or object into which the spring loop has been incorporated. The utility of the structure or object is greatly diminished since the broken spring loop will cause the corresponding panel to assume a distorted configuration. In addition, the structure or object can no longer be folded and collapsed. As a result, the structure or object will typically be disposed of. More importantly, the breakage of a spring loop can be dangerous to the user, especially when it occurs during the folding and collapsing of the spring loop. This is because the broken ends of the spring loop are sharp and often tend to pierce the fabric sleeve in which it is retained. These sharp broken ends can cut or otherwise injure the user.

Attempts have been made to protect the user against breakage of these spring loops. For example, there has been provided a spring loop with a circular cross-section, and a circular plastic sleeve has been slidably positioned over the spring loop in a tight fit so that the spring loop is securely retained inside the lumen of the sleeve. As a result, the broken ends of the spring loop would be retained inside the plastic sleeve to maintain the spring loop in its expanded configuration, and to prevent the broken ends from piercing the larger fabric sleeve of the fabric or other panel. Therefore, even though the structure or object embodying the broken spring loop would probably have little or no further utility, it at least provides a measure of safety that minimizes injury to the user, and especially to children.

Unfortunately, these sleeved spring loops with circular cross-sections suffer from the drawback that they are not easy to use. In particular, the spring loops with circular cross-sections alone are difficult to twist and fold, and exhibit a greater tendency to return to their normal expanded configurations. In other words, a greater force is required to retain the plurality of concentric loop members in the folded or collapsed configuration. The provision of a tight-fitting circular plastic sleeve over the spring loop with a circular cross-section increases the radius of the spring loop, and thereby requires an even greater force to twist and fold the sleeved spring loop, which makes the sleeved spring loop more difficult to collapse. In addition, the sleeved spring loop would exhibit an even greater tendency to return to its normal expanded configuration. Therefore, a user who is not using enough force to twist and fold the sleeved spring loop may find the sleeved spring loop unexpectedly springing back at the user, possibly causing injury. In addition, the stresses stored in a collapsed sleeved spring loop are greater, which reduces the durability of the sleeved spring loop.

SUMMARY OF THE DISCLOSURE

It is therefore an object of the present invention to provide a spring loop assembly having improved safety features that minimizes potential injury when the loop member of the spring loop breaks.

It is another object of the present invention to provide a spring loop assembly that is easy to twist and fold to the collapsed configuration.

It is yet another object of the present invention to provide a spring loop assembly that requires minimal force to twist and fold to the collapsed configuration, and which minimizes the amount of stress stored in the loop member when it is retained in its collapsed configuration.

It is yet a further object of the present invention to provide a spring loop assembly in which a broken loop member is retained inside a protective covering while retaining the original shape of the loop member in the expanded configuration.

In order to accomplish the objects of the present invention, there is provided a spring loop assembly which has an expanded configuration and a collapsed configuration. The spring loop assembly can be twisted and folded from the expanded configuration to reduce the overall size of the spring loop assembly in the collapsed configuration. The spring loop assembly includes a loop member forming a continuous loop, with the loop member having an elongated cross-section throughout. The loop member forms a plurality of concentric loops when in the collapsed configuration. The spring loop assembly further includes a covering surrounding the outer surface of the loop member in a tight-fit manner, the covering having an elongated cross-section throughout.

In one embodiment of the present invention, the covering is made from a strong but flexible material, and is made of a material selected from the group consisting of PVC, plastic, rubber, polymers, cloth and woven fabrics. The ratio between the outer width and the outer height of the covering is greater than 1.3 to 1.

In one embodiment of the present invention, the loop member is formed from a coilable material having a "shape memory" characteristic which causes the loop member to spring back to its expanded configuration when it is not retained in the collapsed configuration. In one embodiment, the coilable material is a flexible coilable steel.

The loop member can be provided in a variety of cross-sectional configurations, such as rectangular, generally rectangular having rounded corners, trapezoidal, oval, and a cross-sectional configuration having a V-shaped section connected to and flanked by two elongated sections.

In another embodiment of the present invention, the loop member has first and second opposing ends, and a first sheath having a lumen for receiving the first and second ends of the loop member. The first and second ends of the loop member each has a short segment which is not surrounded by the covering, with the first sheath covering the uncovered short segments. A second sheath has a lumen that receives the first sheath and the first and second ends of the loop member.

The present invention also provides methods of making a spring loop. According to one method of the present invention, in a first step, a loop member is provided having an elongated cross-section throughout, the loop member having an expanded configuration and a collapsed configuration, and which can be twisted and folded from the expanded configuration to reduce the overall size of the loop member in the collapsed configuration. In a second step, a covering is applied to surround the outer surface of the loop member, the covering having an elongated cross-section throughout. In a third step, the loop member is tightly fitted inside the covering.

Thus, the spring loop assemblies according to the present invention provide strong protective coverings that securely retain the loop members to minimize the likelihood that a broken or free end of the loop member would protrude and cause injury to the user. The protective coverings do not impair the performance, function and utility of the spring loop assemblies, while facilitating ease of operation during the twisting and folding steps. The durability of the spring loop assemblies is also improved since less stress is stored in the loop members when they are in the collapsed configurations.

BRIEF DESCRIPTION OF THE DRAWINGS

FIG. 1 is a perspective view of a spring loop member according to a first embodiment of the present invention;

FIG. 2 is a cross-sectional view of the spring loop member of FIG. 1 taken, along section 2—2 in FIG. 1 thereof;

FIGS. 2A–2D are cross-sectional views of alternative cross-sectional configurations that can be provided for the spring loop member of FIG. 1;

FIG. 3 is a perspective view of a spring loop member according to a second embodiment of the present invention; and FIG. 4 is a perspective exploded view of a portion of the spring loop member of FIG. 3.

DETAILED DESCRIPTION OF THE PREFERRED EMBODIMENTS

Figure 5:
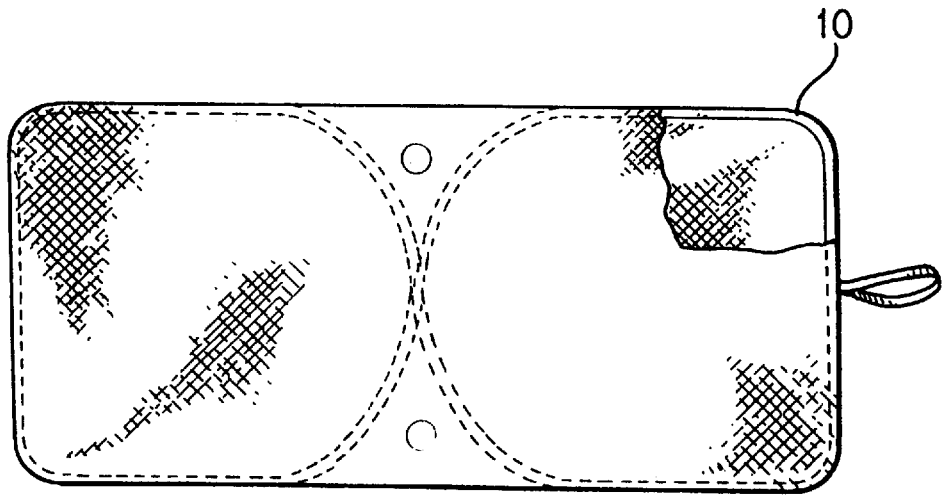
FIG. 5 is a perspective view of a collapsible sun shade embodying the spring loop member of FIG. 1.
Figure 6:
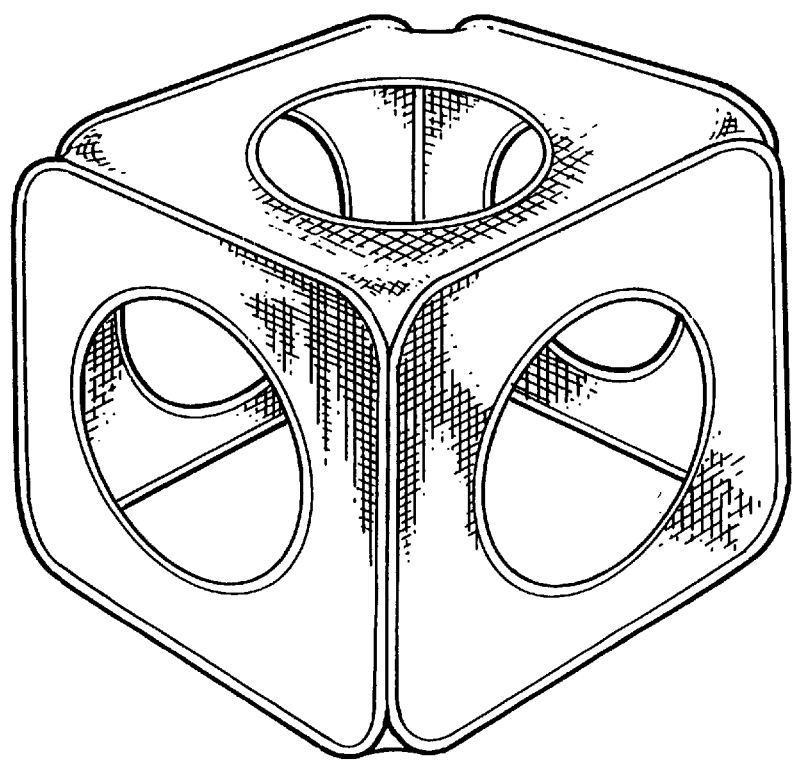
FIG. 6 is a perspective view of a collapsible structure embodying the spring loop member of FIG. 1.

The following detailed description is of the best presently contemplated modes of carrying out the invention. This description is not to be taken in a limiting sense, but is made merely for the purpose of illustrating general principles of embodiments of the invention. The scope of the invention is best defined by the appended claims.

The present invention provides a protective covering or casing that is used in connection with spring loops having an elongated cross-section. The protective covering encases the spring loop, and is provided in a strong yet flexible material which effectively retains the broken or free ends of the spring loop inside the covering and prevents the broken or free ends from piercing the covering. The protective covering is also provided with an elongated cross-section, and is relatively thin. The elongated nature of the spring loops and the coverings of the present invention greatly facilitate the twisting and folding of the encased spring loop, thereby making the encased spring loop easy to use while significantly increasing the safety of the device in which it is used. In this regard, the elongated nature of the spring loops and protective coverings of the present invention renders them significantly easier to twist and fold, and results in the storage of a lesser amount of stress when in the collapsed configuration, when compared to the spring loops of the prior art that have circular cross-sections.

Referring now to the drawings, FIGS. 1 and 2 illustrate a spring loop assembly 10 according to a first embodiment of the present invention. The spring loop assembly 10 is provided as one continuous loop, and has a loop member 12 encapsulated or encased inside a protective covering 14. The loop member 12 is preferably encased in a tight-fit manner so that movement of the loop member 12 within the lumen of the protective covering 14 is minimized. It is also possible to provide a small spacing in the lumen of the protective covering 14 between the loop member 12 and the inner wall of the protective covering 14, but this spacing should preferably be small enough to prevent significant movement of the loop member 12 within the protective covering 14.

The loop member 12 has an elongated cross-section, and as shown in FIG. 2, may assume a generally rectangular cross-section. The loop member 12 is preferably made of flexible coilable steel, although other materials such as plastics, bamboo and wood can also be used. The material used for the loop member 12 should be relatively strong and yet is flexible to a sufficient degree to allow it to be coiled using minimal force. In this regard, the loop member 12 is preferably a thin strip of material, having a non-limiting thickness or height H of about 0.25 cm, and a non-limiting width or elongation W of about 1.0 cm. In general, the ratio between the width W and the height H of the loop member 12 is preferably greater than 1.3 to 1. The loop member 12 is preferably capable of assuming two configurations, a normal open or expanded configuration, and a folded or collapsed configuration in which the spring loop assembly 10 is collapsed into a size which is much smaller than its open configuration. The loop member 12 has a "shape memory" feature which causes it to spring back to its normal expanded configuration when it is not held or retained in the collapsed position.

The protective covering 14 has an elongated lumen and cross-section, and is preferably made of a material that is sufficiently strong and hard to resist piercing by a sharp broken or free end of the loop member 12, yet is sufficiently flexible to facilitate, and not impede, the twisting and folding actions required to collapse the loop member 12. As with the loop member 12, the ratio between the outer width WC and the outer height HC of the covering 14 is preferably greater than 1.3 to 1. Examples of such materials include PVC, rubber, plastic, polymers, certain types of cloth, and woven fabrics. The protective covering 14 preferably has sufficient thickness to resist piercing by a sharp broken or free end of the loop member 12, yet facilitates, and does not impede, the twisting and folding actions required to collapse the loop member 12. As a result, the protective covering 14 is effective in retaining the loop member 12 inside the covering 14 and in its original shape even if the loop member 12 is broken.

The protective covering 14 provides two additional benefits. First, since the generally rectangular loop member 12 illustrated in FIG. 2 has sharp corners 16, the encasement provided by the protective covering 14 rounds out these sharp corners 16. This prevents wear and tear of the thin fabric sleeve which retains the prior art spring loops, since the sharp corners 16 of an uncovered loop member 12 would otherwise rub against the thin fabric sleeve when the device or object is placed on a surface. Second, the protective covering 14 adds weight to the usually lightweight loop member 12, thereby providing a heavier frame (i.e., the spring loop) which would increase the stability of the device or object in which the spring loop assembly 10 is used.

The loop member 12 is encased inside the protective covering 14 according to one of a number of a methods. According to one method according to the present invention, the loop member 12 is placed into a mold and the material of the protective covering 14 is applied in liquified or molten form into the mold surrounding the loop member 12. The material is allowed to cool so that the protective covering 14 completely encapsulates the loop member 12 and prevents movement of the loop member 12 within the lumen of the protective covering 14.

According to another method according to the present invention, the protective covering 14 is provided separately from a strip of the loop member 12 having opposing ends, and the loop member 12 is slid into and through the lumen of the protective covering 14. The lumen of the protective covering 14 is sized and configured to be slightly larger than the body of the loop member 12 so that the loop member 12 can be slid into and through the lumen, while minimizing movement of the loop member 12 in the lumen after the loop member 12 has been deployed therein. The opposite ends of the loop member 12 are then affixed together by rivets or by using similar connection techniques.

Although the cross-sectional configuration of the loop member 12 has been illustrated in FIG. 2 as being generally rectangular, it is also possible to provide the cross-sectional configuration of the loop member 12 in a variety of configurations, as long as they are elongated in nature. For example, in FIG. 2A, the loop member 12a has a generally oval cross-sectional configuration having no corners. As another example, FIG. 2B illustrates another loop member 12b which has a generally rectangular cross-sectional configuration (as in FIG. 2), but with its four corners 16b having been rounded off or curved. As yet another example, FIG. 2C illustrates a loop member 12c which has a generally trapezoidal cross-sectional configuration. As yet a further example, FIG. 2D illustrates a loop member 12d which has a cross-sectional configuration having a V-shaped section 17 flanked by and connected to two generally elongated sections 18.

Regardless of whichever cross-sectional configuration of the loop member is selected, the protective covering 14 preferably has a lumen that is configured to receive the loop member 12, or 12a–12d, in a tight-fitting manner, as described above. In addition, the configuration of the outer body of the protective covering 14 can assume the same configuration as the cross-sectional configuration of the loop member 12, or can be provided in any elongated configuration that is different from the cross-sectional configuration of the loop member 12.

FIGS. 3 and 4 illustrate a spring loop assembly 20 according to a second embodiment of the present invention. The spring loop assembly 20 is provided as a loop member 22 having opposing ends 24 and 26 that are connected by a connection system (described in greater detail below), with the connected loop member 22 encapsulated or encased inside a protective covering 28. The loop member 22 is again preferably encased in a tight-fit manner so that movement of the loop member 22 within the lumen of the protective covering 28 is minimized. A spacing may be provided between the loop member 22 and the protective covering 28, as explained above in connection with spring loop assembly 10. The loop member 22 has an elongated cross-section (see FIG. 4), and can be provided with the same materials, properties and dimensions as the loop member 12 described above, and in any of the cross-sectional configurations illustrated in FIGS. 2 and 2A–2D. Similarly, the protective covering 28 has an elongated cross-section and lumen, and can be provided with the same materials, properties and dimensions as the protective covering 14 described above.

The loop member 22 is encased inside the protective covering 28 according to one of a number of a methods. According to one method according to the present invention, the loop member 22 is placed into a mold and the material of the protective covering 28 is applied in liquified or molten form into the mold surrounding the loop member 22. The material is allowed to cool so that the protective covering 28 completely encapsulates the loop member 22 and prevents movement of the loop member 22 within the lumen of the protective covering 28.

According to a second method, the protective covering 28 is provided separately from the loop member 22, and the loop member 22 is slid into and through the lumen of the protective covering 28. The lumen of the protective covering 28 is sized and configured to be slightly larger than the body of the loop member 22 so that the loop member 22 can be slid into and through the lumen, while minimizing movement of the loop member 22 in the lumen after the loop member 22 has been deployed therein.

Regardless of the method used to encapsulate the loop member 22 with the protective covering 28, a small section of the ends 24 and 26 of the loop member 22 are not encapsulated, to facilitate connection by the connection system described below.

The connection system used to connect the opposing ends 24 and 26 of the loop member 22 includes two sheaths 30 and 32. An internal sheath 30 is sized and configured as the protective covering 28, and includes a lumen 34 having the same cross-sectional configuration as the cross-sectional configuration of the loop member 22, and includes opposing open ends 36 and 38. The lumen 34 is sized and configured to receive the ends 24 and 26 of the loop member 22. In particular, an open end 36 of the internal sheath 30 receives one of the ends, such as 24, of the loop member 22 into the lumen 34, and the other open end 38 of the internal sheath 30 receives the other end 26 of the loop member 22 into the lumen 34, to connect the ends 24 and 26 of the loop member 22 to create a generally circular loop member. Thus, the internal sheath 30 is adapted to encapsulate and cover the non-encapsulated sections of the ends 24 and 26 of the loop member 22, so that the internal sheath 30 and the protective covering 28 together form a continuous covering extending around the entire loop member 22.

The external sheath 32 is provided to cover the internal sheath 30 and the adjacent portions of the protective covering 28. The external sheath 32 includes a lumen 40 having opposing open ends 42 and 44, and having the same cross-sectional configuration as the outer configuration of the protective covering 28. The lumen 40 is sized and configured to receive the combined loop member 22 and protective covering 28. Preferably, the lumen 40 is sized and configured to be slightly larger than the body of the combined loop member 22 and protective covering 28 so that the external sheath 32 can be advanced along the outer surface 46 of the protective covering 28, while minimizing movement of the combined loop member 22 and protective covering 28 in the lumen 40 after connection.

In use, an open end 42 of the external sheath 32 is advanced over the loop member 22 and protective covering 28 at end 24, and advanced along the outer surface 46 of protective covering 28 until the external sheath 32 is advanced beyond the non-encapsulated segment at end 24. The internal sheath 30 is then deployed in the manner described above so that it connects both ends 24 and 26 of the loop member 22, and completely covers and encapsulates the non-encapsulated segments at the ends 24 and 26. The external sheath 32 is then advanced over the internal sheath 30 to completely cover the internal sheath 30 and portions of the protective covering 28 adjacent the internal sheath 30 (see FIG. 3).

Alternatively, the end 24 of loop member 22 may be inserted into the lumen 34 at the open end 36 of the internal sheath 30. The external sheath 32 is then advanced over the open end 38 of the internal sheath 30, over and past the internal sheath 30, and over the outer surface 46 of the protective covering 28 adjacent the end 24. At this time, the other end 26 of the loop member 22 is inserted into the lumen 34 at the open end 38 of the internal sheath 30. The external sheath 32 is then advanced in the opposite direction over the open end 36 of the internal sheath 30 and over the internal sheath 30 until its end 44 has passed the open end 38 of the internal sheath 30 and over the outer surface 46 of the protective covering 28 adjacent the end 26.

The internal sheath 30 and external sheath 32 may be made from the same type of material used for the protective covering 28. Thus, the internal sheath 30 operates to provide a smooth connection for the ends 24 and 26 of the loop member 22, while minimizing piercing of the walls of internal sheath 30 by the ends 24 and 26. To improve the connection, the ends 24 and 26 may be glued or secured by similar conventional techniques inside the lumen 34 of the internal sheath 30. The external sheath 32 provides an additional safety mechanism to secure the connection of the ends 24 and 26 of the loop member 22, and further reduces the risk that the ends 24 and 26 would be exposed since it is unlikely that these ends 24 and 26 would pierce both the internal sheath 30 and the external sheath 32. To achieve this end, the external sheath 32 is preferably longer than the internal sheath 30, so that it not only completely covers the internal sheath 30, but also covers a significant portion of the protective covering 28 adjacent both ends 36 and 38 of the internal sheath 30. This ensures that the internal sheath 30 will securely retain both ends 24 and 26 of the loop member 22. This further minimizes the likelihood that the external sheath 32 will be advanced so much during normal use (i.e., during folding and twisting operations) that it would no longer cover the internal sheath 30. In this regard, the length and thickness of the external sheath 32 should be provided such that the external sheath 32 does not impede the operation, or reduce the efficiency, of the spring loop assembly 20, such as during the twisting and folding steps to collapse the spring loop assembly 20.

Thus, the spring loop assemblies 10 and 20 according to the present invention provide protective coverings 14 and 28, and connection systems (for spring loop assembly 20), that minimize the likelihood that a broken or free end of the loop member 12, 22 would protrude and cause injury to the user by providing strong protective coverings 14 and 28 to securely retain the loop member 12 therein. The protective coverings 14 and 28 also do not impair the performance, function and utility of the spring loop assemblies 10, 20, while facilitating ease of operation during the twisting and folding steps. The durability of the spring loop assemblies 10, 20 is also improved since less stress is stored in the loop members 12, 22 when they are in the collapsed configurations.

While the description above refers to particular embodiments of the present invention, it will be understood that many modifications may be made without departing from the spirit thereof. The accompanying claims are intended to cover such modifications as would fall within the true scope and spirit of the present invention.

What is claimed is:

1. A spring loop assembly which has an expanded configuration and a collapsed configuration, and which can be twisted and folded from the expanded configuration to reduce the overall size of the spring loop assembly in the collapsed configuration, the spring loop assembly comprising:

a loop member forming a continuous loop, the loop member having an elongated cross-section throughout, first and second opposing ends, and an outer surface, the loop member forming a plurality of concentric loops when the loop member is in the collapsed configuration, the first and second ends of the loop member each having a short segment which is not surrounded by the covering;

a covering surrounding the outer surface of the loop member in a tight-fit manner, the covering having an elongated cross-section throughout; and a first sheath having a lumen for receiving the first and second ends of the loop member, and wherein the first sheath covers the uncovered short segments.

2. The device of claim 1, wherein the covering is made from a strong but flexible material.

3. The device of claim 2, wherein the loop member is formed from a coilable material having a "shape memory" characteristic which causes the loop member to spring back to its expanded configuration when it is not retained in the collapsed configuration.

4. The device of claim 3, wherein the loop member is made from a flexible coilable steel.

5. The device of claim 1, wherein the loop member has a rectangular cross-section.

6. The device of claim 1, wherein the loop member has a generally rectangular cross-section having rounded corners.

7. The device of claim 1, wherein the loop member has a trapezoidal cross-section.

8. The device of claim 1, wherein the loop member has an oval cross-section.

9. The device of claim 1, wherein the loop member has a cross-section that includes a V-shaped section connected to and flanked by two elongated sections.

10. The device of claim 2, wherein the covering is made of a material selected from the group consisting of PVC, plastic, rubber, polymers, cloth and woven fabrics.

11. The device of claim 1, further comprising a second sheath having a lumen for receiving the first sheath and the first and second ends of the loop member.

12. The device of claim 1, wherein the covering has an outer width and an outer height, and wherein the ratio between the outer width and the outer height of the covering is greater than 1.3 to 1.

13. A method of making a spring loop assembly, comprising the steps of:

a. providing a loop member having an elongated cross-section throughout, an outer surface, and first and second opposing ends, the loop member having an expanded configuration and a collapsed configuration, and which can be twisted and folded from the expanded configuration to reduce the overall size of the loop member in the collapsed configuration, wherein the loop member forms a plurality of concentric loops when in the collapsed configuration;

b. applying a covering to surround the outer surface of the loop member, the covering having an elongated cross-section throughout;

c. ensheathing the first and second ends of the loop member; and d. covering the ensheathed first and second ends of the loop member.

14. The method of claim 13, wherein step (b) includes the step of:

providing the first and second ends of the loop member with a short segment which is not surrounded by the covering.

15. The method of claim 14, wherein step (c) includes the step of:

providing a first sheath to cover the uncovered short segments.

16. The method of claim 15, wherein step (d) includes the step of:

providing a second sheath having a lumen for receiving the first sheath and the first and second ends of the loop member.

17. A collapsible object having:

a. a spring loop assembly which has an expanded configuration and a collapsed configuration, and which can be twisted and folded from the expanded configuration to reduce the overall size of the spring loop assembly in the collapsed configuration, the spring loop assembly including:

(i) a loop member forming a continuous loop, the loop member having elongated cross-section throughout, and an outer surface, the loop member forming a plurality of concentric loops when the loop member is in the collapsed configuration; and (ii) a covering surrounding the outer surface of the loop member in a tight-fit manner, the covering having an elongated cross-section throughout; and b. a panel extending across the spring loop assembly; the panel having a sleeve for retaining the spring loop assembly.

18. The object of claim 17, wherein the covering is made from a strong but flexible material.

19. The object of claim 18, wherein the loop member is formed from a coilable material having a "shape memory" characteristic which causes the loop member to spring back to its expanded configuration when it is not retained in the collapsed configuration.

20. The object of claim 19, wherein the loop member is made from a flexible coilable steel.

21. The object of claim 17, wherein the loop member has a rectangular cross-section.

22. The object of claim 17, wherein the loop member has a generally rectangular cross-section having rounded corners.

23. The object of claim 17, wherein the loop member has a trapezoidal cross-section.

24. The object of claim 17, wherein the loop member has an oval cross-section.

25. The object of claim 17, wherein the loop member has a cross-section that includes a V-shaped section connected to and flanked by two elongated sections.

26. The object of claim 18, wherein the covering is made of a material selected from the group consisting of PVC, plastic, rubber and polymers.

27. The object of claim 17, wherein the covering has an outer width and an outer height, and wherein the ratio between the outer width and the outer height of the covering is greater than 1.3 to 1.

* * * * *